US010613493B2

(12) United States Patent
Liu (10) Patent No.: US 10,613,493 B2
(45) Date of Patent: Apr. 7, 2020

(54) FUSION SENSOR WIRELESS DECISION DEVICE AND SYSTEM FOR USING THE SAME

(71) Applicant: Chang Liu, Winnetka, IL (US)

(72) Inventor: Chang Liu, Winnetka, IL (US)

( * ) Notice: Subject to any disclaimer, the term of this patent is extended or adjusted under 35 U.S.C. 154(b) by 401 days.

(21) Appl. No.: 15/667,310

(22) Filed: Aug. 2, 2017

(65) Prior Publication Data

US 2018/0039241 A1 Feb. 8, 2018

Related U.S. Application Data

(60) Provisional application No. 62/370,818, filed on Aug. 4, 2016, provisional application No. 62/370,250, filed on Aug. 3, 2016.

(51) Int. Cl.
*G05B 15/02* (2006.01)
*G01D 7/00* (2006.01)
*G01D 18/00* (2006.01)
*G01D 21/02* (2006.01)

(52) U.S. Cl.
CPC ............... *G05B 15/02* (2013.01); *G01D 7/00* (2013.01); *G01D 18/00* (2013.01); *G01D 21/02* (2013.01); *G05B 2219/2642* (2013.01)

(58) Field of Classification Search
None
See application file for complete search history.

(56) References Cited

U.S. PATENT DOCUMENTS

| | | | | |
|---|---|---|---|---|
| 2007/0282944 | A1* | 12/2007 | Odaka | H04L 12/2825 709/203 |
| 2013/0132008 | A1* | 5/2013 | Borean | G01D 4/00 702/60 |
| 2014/0043150 | A1* | 2/2014 | Wagner | G08B 25/10 340/286.07 |
| 2014/0123766 | A1* | 5/2014 | Bach | G01D 18/00 73/849 |
| 2017/0083987 | A1* | 3/2017 | Colby | G06Q 30/0283 |

* cited by examiner

*Primary Examiner* — Thomas S McCormack
(74) *Attorney, Agent, or Firm* — Justin Lampel (57) ABSTRACT

A fusion sensor wireless decision device and network system for using the same is provided. The fusion sensor wireless decision device and network may utilize a plurality of independent sensors for monitoring equipment and systems and, therein, allowing a user to monitor and/or control the equipment and systems in an optimal manner. The present system allows a user to drop or plug a self-calibrating sensor into an electrical connector box unit which automatically registers the sensors for use, and calibrates the sensor signal as opposed to calibrating the sensors.

19 Claims, 8 Drawing Sheets

FUSION SENSOR WIRELESS DECISION DEVICE AND SYSTEM FOR USING THE SAME

CROSS-REFERENCE TO RELATED APPLICATIONS

The following application is based on and claims the priority benefit of U.S. provisional application Ser. No. 62/370,250 filed Aug. 3, 2016 and U.S. provisional application Ser. No. 62/370,818 filed Aug. 4, 2016; the entire contents of both which are incorporated by reference.

BACKGROUND OF THE INVENTION

A fusion sensor wireless decision device and network system for using the same is provided. The fusion sensor wireless decision device and network may utilize a plurality of independent sensors for monitoring equipment (such as a thermostat, or a home appliance unit) and systems (such as a security system or automation equipment) and, therein, allowing a user to monitor and/or control the equipment and systems in an optimal manner. The present system allows a user to drop or plug a self-calibrating sensor into an electrical connector box unit which automatically registers the sensors for use, and calibrates the sensor signal for a specific use (as opposed to calibrating the sensors). The present device and system create a fusion network system incorporating: 1) a connector box unit with intuitive programming and flexible adaption; 2) a plurality of sensors, some being wireless (tether-free) sensors with powering/signal transmission scheme and 3) a self-contained sensor identifier within the connector box unit for easy 'plug and play'. In an embodiment, the present device and system are moisture resistant and electrically grounded.

Current technology generally utilizes a single sensor to control a piece of electrical equipment. For example, a typical indoor air conditioning unit today turns itself off automatically when the desired room temperature is reached according to a reading on a single sensor. However, ideally, the operation of such a unit could also rely on humidity reading and room activities to better control the temperature of a room. In the present system, temperature setting could be adjusted for humidity factors and, the air conditioner may also be turned off if a second sensor determines that no one is in the room. The fusion of such data would allow both comfort and energy reduction. By the present system, having multiple sensors providing input regarding one specific piece of electrical equipment can reduce the chance of false alarms and can increase efficiency of use of the equipment.

As a result, an electronic unit and system which collects data and information from multiple sensor inputs and which fuses such information for an ultimate decision is needed. Units that are currently in use are tailored for specific purposes, and cannot be expanded for adaptive use. The building of such a system is costly, for both individuals and enterprises. The current system is invented with the following factors in mind: adaptability, ease of use, lowering costs.

This present system may be used for both conditional monitoring and functional improvement, or for enhanced safety of equipment. Further, the present system may allow for the fusing of data and information in equipment for many applications such as, for example, manufacturing equipment, automation equipment, construction sites, hospitals, smart homes, and home appliances.

The present system has three aspects important for the sensor system network: 1) connecting a sensor to a piece of equipment; 2) the automatic calibrating the sensor by the system; and 3) the programming of an action based on sensor input. In many prior technology systems, sensors are connected by wires and the output of the unit is connected by wires. However, connecting sensors by wires may be difficult and expensive. In the present system, the wires may be eliminated thus increasing efficiency and ease of use of the system.

Individual sensors must be carefully calibrated, in terms of response curves and full scale. Sensors may present output in the form of voltage levels, resistance, or frequency. It is extremely difficult to both calibrate such sensors, communicate the specifications to equipment designers, and then account for the sensor individuality in system design. Each system must be designed separately, by carefully setting circuit elements, circuit layouts, and embedded programs, to match the sensor it accesses. This process is tedious, time consuming, and expensive.

Another benefit of the present system is that the present system may eliminate sensor calibration steps for the user, so that the plurality of sensors of the present system may merely be used in a "plug and play" fashion, so that no further action is needed when installing a new sensor or replacing an old sensor with a new one. In prior technology systems, a sensor would be plugged into a piece of equipment and then the user had to calibrate the sensor with the equipment by, for example, utilizing a separate CD having software or the user had to download a current version of a driver. Thus, the prior technology systems required immense technical knowledge to allow communication between a sensor and a piece of equipment when a sensor was installed. By the present system, the sensor is automatically calibrated, thus eliminating the communication problem between the sensor and the piece of equipment.

In particular, the sensor is not calibrated for its own physical characteristics, but for the situation of use. More specifically, in the present system, a user simply "drops" or "plugs" a sensor into the control box (physically or through wireless communication) and therein the sensor is automatically calibrated for the desired alarm/notification threshold, without actually needing the user to proactively calibrate the sensor itself. The calibration may be for the signal, not for the piece of equipment or sensor. For example, a vibration sensor may be calibrated already for its vibration, but when it is connected to the fusion control box, the sensor may be calibrated for the vibration of the fusion control box.

A memory unit within an interior of the control box (or "signal conditioning unit") records the sensor specifications, including the type of sensor, the model number of the sensor, and any necessary specification curves. In essence, a memory unit of the control box basically provides a look-up table, or "ID" of sort, for the sensor which is to be plugged into the control box. The ID of the sensor is read upon insertion of the sensor into the control box, hence a user no longer needs to deal with the sensor as a physical entity, but only as an electronic, digital, wholesome entity.

The memory unit of the control box may record at least the following information: sensor manufacturer, manufacturing date, model name, the response curve to the signal of interest. In an embodiment, the memory unit may record the response curve to temperature, humidity, and aging, the operational temperature range, and the full scale associated with the sensor. The memory unit may also record information related to calibration of the sensor. Upon dropping the sensor into the control box, the sensor's identify is established, and the control box may use the sensor accordingly.

In an embodiment, a separate database of the sensor and/or the manufacturer of the sensor is maintained online.

The present sensor decision network system may produce alarms or actions when a certain predetermined pattern of sensor activity is reached. In some cases, such actions may involve wirelessly sending out signals or alarms to a user, so that the person may verify the situation. To program for such actions generally takes time and efforts. It would be advantageous to reduce the time and cost of accurate programming.

Over the years, attempts have been made to provide sensor fusion technology. For example, U.S. Pat. No. 5,218,440 to Mathur provides an electronic image processing system uses data provided by one or more sensors to perform cooperative computations and improve image recognition performance. A smoothing resistive network, which may comprise an integrated circuit chip, has switching elements connected to each node. The system uses a first sensory output comprising primitives, such as discontinuities or object boundaries, detected by at least a first sensor to define a region for smoothing of a second sensory output comprising at least a second, distinct output of the first sensor or a distinct output of at least a second sensor. A bit pattern for controlling the switches is generated from the detected image discontinuities in the first sensory output. The second sensory output is applied to the resistive network for data smoothing. The switches turned off by the data from the first sensory output define regional boundaries for smoothing of the data provided by the second sensory output. Smoothing operations based on this sensor fusion can proceed without spreading object characteristics beyond the object boundaries.

Further, U.S. Pat. No. 9,389,681 to Sankar discloses a sensor fusion interface that enables interaction between one or more entities of a physical environment and a computerized device component. A plurality of sensor modules generate multiple sensor input data associated with one or more entities in an environment and store such data in a shared library in accordance with a uniform and common schema. The multiple sensor input data is refined until a certain level of accuracy is achieved. Using the sensor fusion interface, entity state data is extracted from the shared library and exposed to the computerized device component.

Still further, U.S. Pat. No. 9,031,809 to Kumar discloses a method and apparatus for providing three-dimensional navigation for a node comprising an inertial measurement unit for providing gyroscope, acceleration and velocity information (collectively IMU information); a ranging unit for providing distance information relative to at least one reference node; at least one visual sensor for providing images of an environment surrounding the node; a preprocessor, coupled to the inertial measurement unit, the ranging unit and the plurality of visual sensors, for generating error states for the IMU information, the distance information and the images; and an error-state predictive filter, coupled to the preprocessor, for processing the error states to produce a three-dimensional pose of the node.

However, these patents fail to describe a device and system for creating a fusion sensor wireless decision device and network system incorporating: 1) a connector box with intuitive programming; 2) a tether-free sensor with powering/signal transmission scheme and 3) a self-contained sensor identifier for easy plug and play in the unique manner as provided herein.

SUMMARY OF THE INVENTION

A fusion sensor wireless decision device and network system for using the same is provided. The fusion sensor wireless decision device and network may utilize a plurality of independent sensors for monitoring equipment (such as a thermostat, or a home appliance unit) and systems (such as a security system or automation equipment) and, therein, allowing a user to monitor and/or control the equipment and systems in an optimal manner. The present system allows a user to drop or plug a self-calibrating sensor into an electrical connector box unit which automatically registers the sensors for use, and calibrates the sensor signal for a specific use (as opposed to calibrating the sensors). The present device and system create a fusion network system incorporating: 1) a connector box unit with intuitive programming and flexible adaption; 2) a plurality of sensors, some being wireless (tether-free) sensors with powering/signal transmission scheme and 3) a self-contained sensor identifier within the connector box unit for easy 'plug and play'. In an embodiment, the present device and system are moisture resistant and electrically grounded.

The present system creates a fusion network by providing the following: 1) a connector box unit with intuitive programming; 2) a plurality of wireless (tether-free) sensors with powering/signal transmission scheme and 3) a self-contained sensor identifier within the connector box unit for easy 'plug and play'.

The present network system comprises hardware gear, protocols, and a chip-level implementation plan. It forms the core bottom layer of the Internet of Things (IoT) architecture. The present system is intended to make IoT implementation process easy, and to allow sensors to be used in many places previously unpenetrated market.

Another benefit of the present system is that the present system may make decisions using a MIMO (Multiple input, Multiple output) format; where multiple streams of sensor inputs from multiple sensors may be easily plugged into the connector box (or 'MIMO'). The connector box may contain algorithms which are programmed though an intuitive user interface. The connector box would therein generate desired output (sound alarms, visual cues, messages sent through wire or wireless connections) once a predetermined set of sensors triggers an event.

The MIMO interface recognizes inserted elements automatically, for example, Temperature Sensor #1, Vibration Sensor #2, etc. The MIMO box also recognizes output devices automatically, such as Bluetooth #1, Wifi #1, etc. The program provides a drag-and-place, "calculator like" interface for programming the logic. For example, "IF Temperature Sensor #1 is over 100 degrees AND Vibration Sensor #2 is over 1 g acceleration, ACTIVATE Bluetooth #1 and SEND a message". Or "Activate Wifi AND Bluetooth to send TWO messages TO A and B".

In one instance, a sensor unit may be powered wirelessly and read wirelessly. Such arrangement allows the sensor units to be detached, such as embedded in a wearable item that would be greatly inconvenienced by the presence of a wire. In another instance, the sensor unit may contain signal processing electronics as well as data signature information. Simply plugging the sensor into the connector box allows the sensor characteristics to be recognized. Such sensor characteristics would include sensor name, type, measurement range, sensitivity, make and model, etc.

A sensor produces electric signals (voltage, current, pulse, etc) in response to changes in the environment (such as movement, tilting, media velocity, applied force, temperature, etc). The signal needs to be amplified, filtered, and, more often than not, digitized. Further, the sensor often requires bias, or powering, from a voltage source. In addition, the sensor signal needs to be transmitted to a computer and logged into memory. The computer then produces actions based on the sensor data it logged. In order for the computer to turn electric signal into parameters that pertain to physical reality, the computer must be able to understand the type of sensor that is producing the signal, so that electric signal can be interpreted and displayed, with accurate value and proper unit designation.

Often, a sensor is reactive to multiple environmental factors. A silicon force sensor, for example, may react to changes of temperature and lighting conditions. To read the force information accurately, for example, information related to light and temperature need to be used to compensate. The sensor may also be biased with a power regulator and the signal may then be turned into digital form using ADC (Analog Digital Convertor). The output signal is then sent wirelessly to the connector box of the present system (also called a 'reader unit' or 'fusion box').

The algorithms for correcting sensor output may be embedded in the present connector box. The present system requires the use of a computer, which limits many field applications. For sensor network to be deployed widely, the cost must be controlled. The cost of site specific computation, modeling, calibration and installation need to be minimized. This current invention addresses some of these elements of concerns.

Another advantage of the present fusion sensor wireless decision device and system is that the present device and system may have a sensor which may be powered and read wirelessly so as to allow a sensor to be detached, such as in a wearable item, therein eliminating the need for an inconvenient wire.

Still another advantage of the present fusion sensor wireless decision device and system is that the present device and system may be moisture or waterproof.

Yet another advantage of the present fusion sensor wireless decision device and system is that the present device and system may be electrically grounded.

In an embodiment of the present device and system, a cable may be shielded with a ground wire to provide electromagnetic noise resistance.

And another advantage of the present fusion sensor wireless decision device and system is that the present device and system may utilize multiple sensors providing input regarding one specific piece of electrical equipment which can therein be read by a connector box which therein makes a decision so as to reduce the chance of false alarms and to more accurately control of the equipment.

For a more complete understanding of the above listed features and advantages of the present fusion sensor wireless decision device and system reference should be made to the detailed description and the detailed drawings. Further, additional features and advantages of the invention are described in, and will be apparent from, the detailed description of the preferred embodiments.

DETAILED DESCRIPTION OF THE PREFERRED EMBODIMENTS

A fusion sensor wireless decision device and network system for using the same is provided. The fusion sensor wireless decision device and network may utilize a plurality of independent sensors for monitoring equipment (such as a thermostat, or a home appliance unit) and systems (such as a security system or automation equipment) and, therein, allowing a user to monitor and/or control the equipment and systems in an optimal manner. The present system allows a user to drop or plug a self-calibrating sensor into an electrical connector box unit which automatically registers the sensors for use, and calibrates the sensor signal for a specific use (as opposed to calibrating the sensors). The present device and system create a fusion network system incorporating: 1) a connector box unit with intuitive programming and flexible adaption; 2) a plurality of sensors, some being wireless (tether-free) sensors with powering/signal transmission scheme and 3) a self-contained sensor identifier within the connector box unit for easy 'plug and play'. In an embodiment, the present device and system are moisture resistant and electrically grounded.

False alarms are common, such as building fire evacuation systems based on fire alarms almost always are false, though infrequent. The way to eliminate is by fusing multiple senses. For example, a fire alarm based on, for example, image analysis and temperature analysis and smoke presence may be better at predicting an actual fire danger.

In an embodiment, if power to a device one of the sensors is connected to is failing, the present device may simply notify the user by automatically stating, for example: "I am not working anymore, replace me." Further, the present device may, for example, eliminate false information and/or bad alarms. The device may also utilize information from both fusion programming and feedback from the community at large. Further the present device may be a simple, functional computerized piece of equipment which is inexpensive so that many people may utilize the same.

Figure 1A:
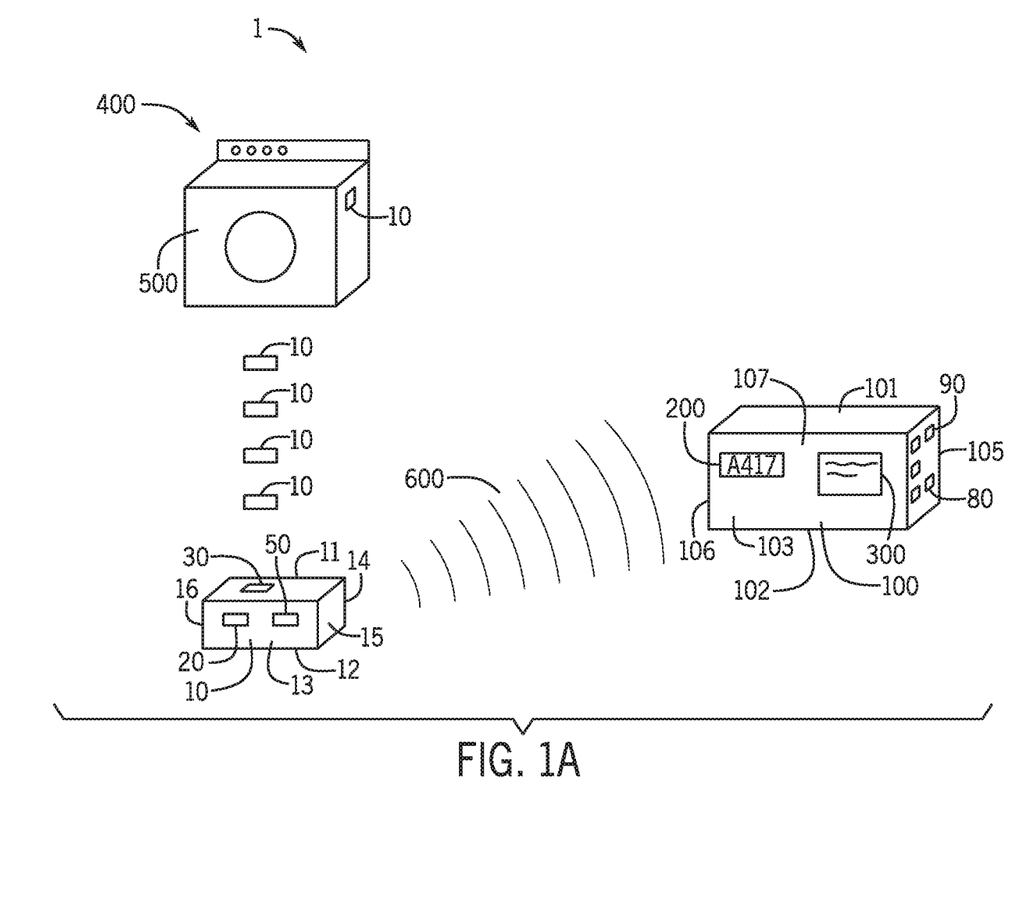
FIG. 1A illustrates components of the system in an embodiment of the system.

Referring first to FIG. 1, in an embodiment, a fusion wireless decision device and system 1 is provided. The fusion wireless decision device and system 1 may have a plurality of sensors 10 and at least one control box unit 100 (or 'MIMO'). The plurality of sensors 10 may be sensors to determine, for example, temperature in a room, movement in a room, humidity in a room, smoke and/or fire within in a room, carbon monoxide levels, electrical power and surges, light, temperature in an oven, dampness in a dryer, etc. Further, additional sensors may be utilized which are not herein listed which relate to safety, comfort or other situations in which a home owner or business owner may wish to monitor.

In an embodiment, the interior of the control box 100 has a central processing unit for processing the data collected by the multiple sensors 10 and making a decision as to control the devices 400 based on the data collected from the multiple sensors 10. The control box 100 then sends a signal (which may be wireless) back to the device 400 to properly control the device 400.

In an embodiment, the plurality of sensors 10 may each have a top 11, a bottom 12, a front 13, a back 14, a first side 14, a second side 15 and an interior 16 having electrical components such as a computer circuit. The sensors 10 may be resistant to moisture and may even be completely waterproof in an embodiment.

In an embodiment, the plurality sensors 10 and the system 1 as a whole may be electrically grounded such that a user 600 (FIG. 1B) would be prevented from obtaining an electrical shock. Further, the electrical grounding of the system 1 and the plurality of sensors 10 may prevent a powerful surge from damaging in the system 1.

In an embodiment, the plurality of sensors 10 may be pre-calibrated to interact with the specific connector box 100 (or 'MIMO' as described below) of the system. In particular, in one embodiment, the plurality of sensors 10 may only electrically communicate with the connector box 100 of the system 1. In particular, in an embodiment, a proprietary communication key may only allow communication between the sensors 10 of the system 1 and the connector box 100 of the system 1 such that other sensors or other connector boxes which do not belong to the present system may not be used. Further, a passcode 200 may be entered directly into the connector box 100 (or console 800 as described below in an embodiment) such that only the owner of the connector box 100 or console 800 may access and control the connector box 100 or console 800.

Figure 1B:
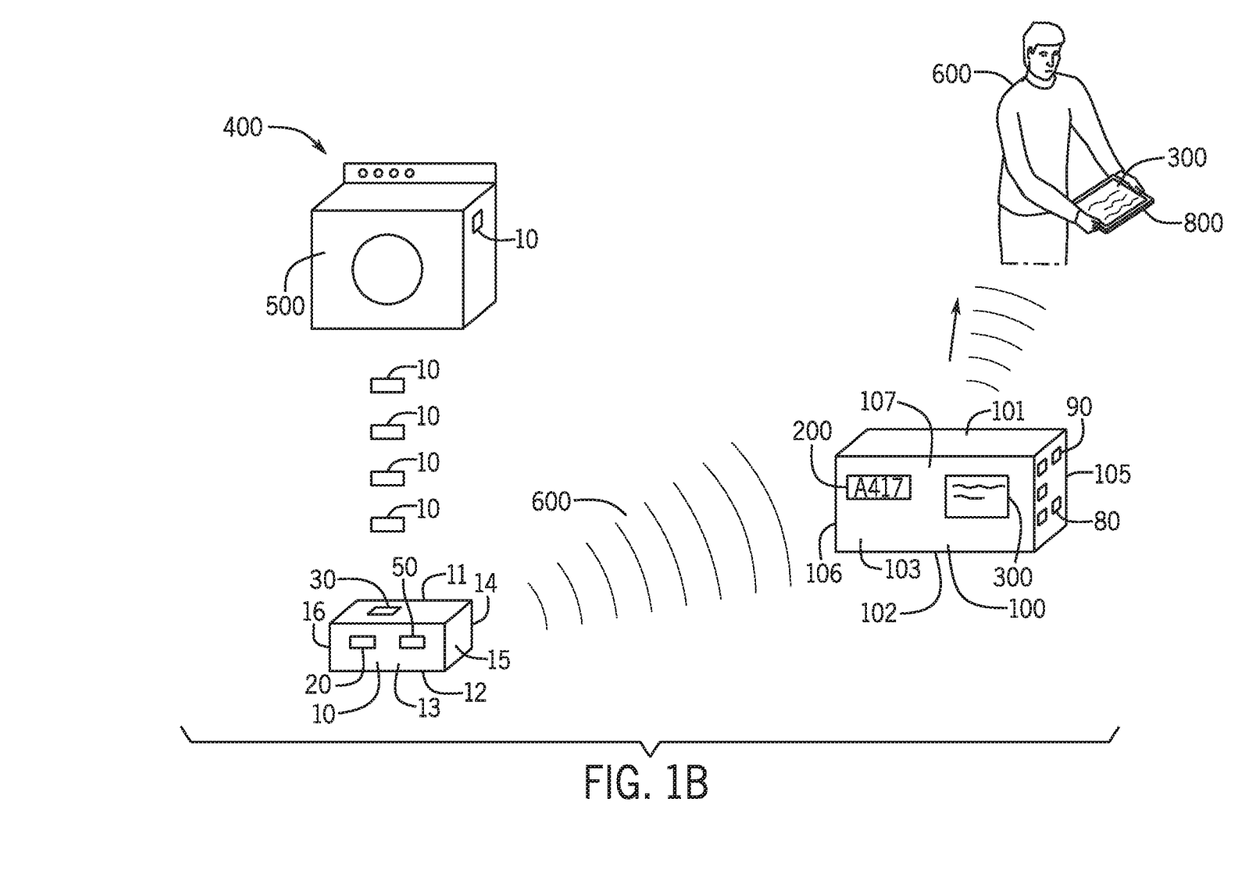
FIG. 1B illustrates the components of the system in an embodiment wherein the system has a console which communicates with the control box (or "MIMO")

In an embodiment, the console 800 and/or connector box 100 may have a digital screen 300 which acts as a control dashboard to control the functions and settings of the sensors 10. Further, in an embodiment, the present system 1 may have an operating system for controlling appliances 400 (or 'piece of equipment') which may electrically communicate with the sensors 10. For example, a clothes dryer 500 may have a sensor 10 connected to the same which connects, wirelessly in an embodiment, with the connector box 100. More specifically, the sensor 10 may be physically part of the clothes dryer 500 or may be, for example, a removable stick device which is inserted into the clothes dryer 500. The sensor 10 may electrically communicate with the connector box 100 by wireless communication, similar to Bluetooth and the connector box 100, in an embodiment, may communicate with the console 800. In an embodiment, the user may control the approximate distance the wireless communication signal 600 may travel. In an embodiment, the sensor 10 may be located in a computer 425.

In one embodiment of the system, multiple sensors 10 may be utilized with the same appliance 500 (such as a clothes dryer). The multiple sensors 10 may have the same or differing functions. For example, there may be two sensors 10 which each monitor the temperature in a room and then average the temperatures prior to activating a thermostat to take an action up or down. Thus, accuracy of the actual temperature is more precise. In another embodiment, a single appliance 400 could have multiple sensors 10 wherein the sensors 10 monitor different elements such as a clothes dryer wherein one sensor monitors dryness in the dryer and another sensor 10 monitors temperature in the dryer. The data may be sent (through wires or wirelessly) to the connector box 100 wherein a decision is automatically made as to keep the dryer running or not or as to if the temperature of the heat expelled in the dryer needs to be adjusted in the dryer.

In an embodiment, the connector box 100 may have a top 101, a bottom 102, a front 103, a back 104, a first side 105, a second side 106, and an interior 107 having electrical components 108, such as an electrical circuit. In an embodiment, the electrical components 108 may be moisture and/or water proof. In an embodiment, the electrical components 108 of the interior 107 of the box 100 may store data obtained from each of the plurality of sensors 10 which the sensors 10 are connected to the box 100 in a manner which allows the flow of data between the sensors 10 and the box 100.

Figure 3A:
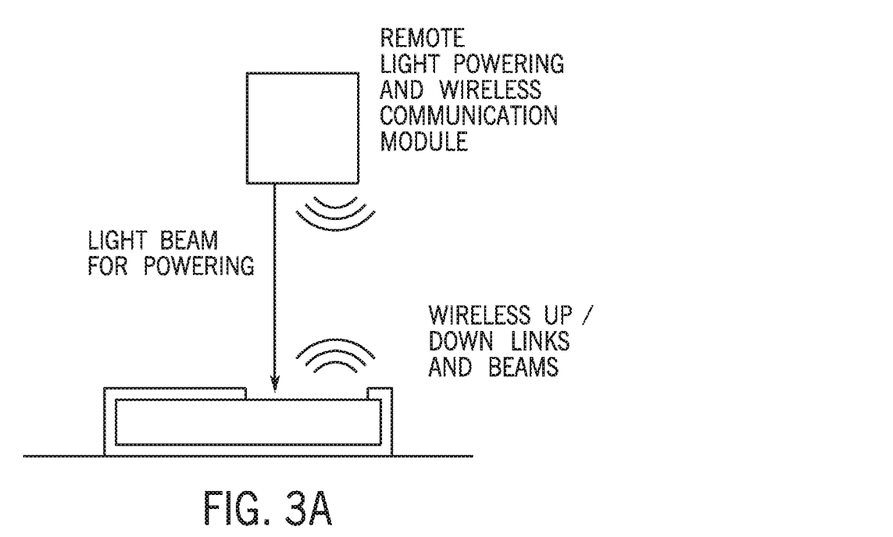
FIGS. 3A and 3B illustrates a diagram of the remote light powering and wireless communication module.
Figure 3B:
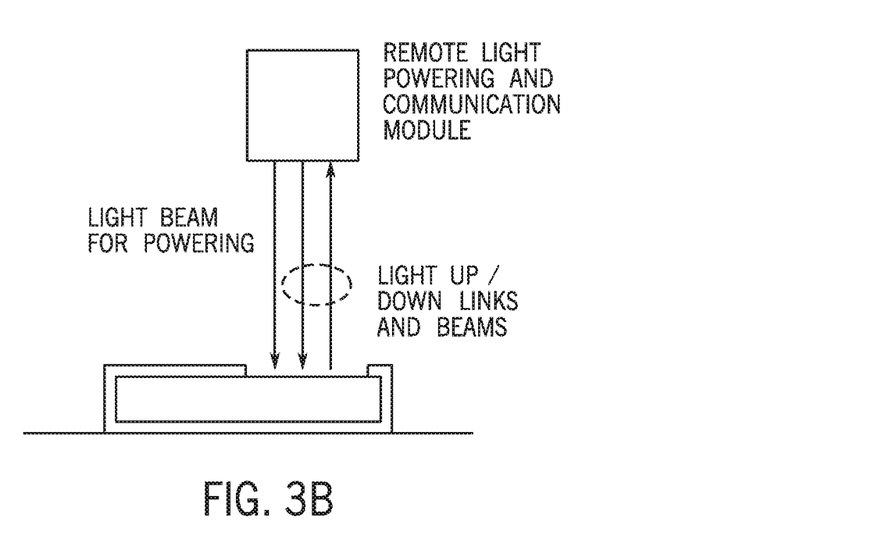
Figure 4:
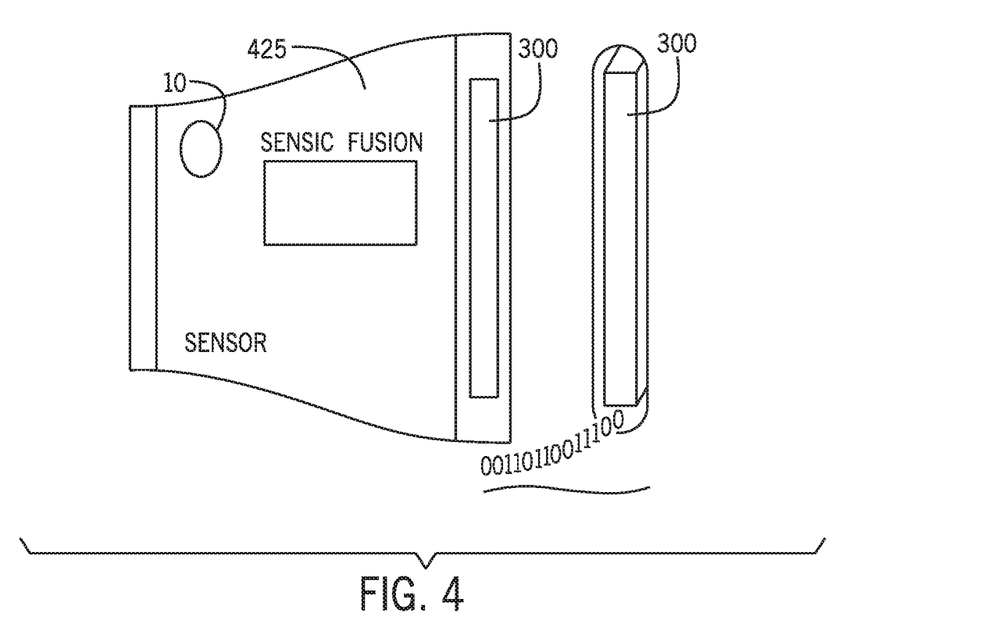
FIG. 4 illustrates one embodiment of the sensor unit. It consists of both the sensor, and the electronics for signal conditioning and identifier, and the connector to the computerized equipment.

In one embodiment of a sensor connection, a sensor chip 20 may be located within the interior of the sensor 10 wherein the sensor 10 is placed close to an inductor 30. The inductor 30, in a typical RFID setup, provides both energy and signals transmission. This is useful for situations where a physical wire is not possible or is otherwise inconvenient, or where wires may present intrusion. The sensor chip 20 may contain circuit elements that regulate an AC signal and turn that into a sustained DC voltage. The signal may also be embedded, and extracted using a circuit 40, which is powered from the sustained DC voltage just received. The embedded signal is then modulated using the output signal, and in turn read by the electronics.

In one embodiment, the sensor chip 20 may be powered by an external light, and the electric signals are provided through RF links. The illumination allows an on-chip photovoltaic unit to receive power. The light allows a sensor to be wirelessly powered, and the RF link allows signals to be wirelessly transferred.

In an embodiment, a circuit illuminates the sensor chip 20. The illumination provides power to the sensor chip 20. In an embodiment, an on-chip solar voltaic cell 50 converts light to energy-voltage. The sensor chip 20 may receive signals in the form of optical modulation or RF modulation, and the sensor chip 20 may then sends signals back to the interrogation unit with light (using on-chip diode).

In one embodiment as illustrated in FIG. 1B, the sensors 10 may send wireless information to the control box 100 (or 'MIMO') just as is illustrated in FIG. 1, and the control box 100 may, in turn, then send the electrical data information obtained from the sensor to a separate console 800. The separate console 800 may be an electronic device easily accessible and easily programmable by a user 600. For example, the separate console 800 may be a computer tablet or phone located near a user's bed which allows a user to control all the components of the network. The separate console 800 may be portable. In an embodiment, the control box 100 and/or the sensors 10 are electrically grounded so as not to cause any shock to the user 600.

The identity and characteristics of one of the plurality of sensors 10 may be embedded in its auxiliary electronics. A database of such sensors may be stored in the connector box 100. Upon plugging the sensor 10 from the connector box 100, the connector box 100 may automatically obtain all of the information of the sensor 10, and may place the electronics output of the sensor 10 into proper context. Thus, there is no need of manually input the information. Information pertaining to the identity of the sensor 10 may therein be self-contained.

In one possible method, of the sensors 10 may send a data stream representing its own characters and properties. In other words, the sensor 10 itself may be "self-reporting". In another method, the box 100 may recognize the sensor 10 by a digital code of the sensor 10 sent by the sensor 10. The box 100 may then look up an interior or online database of various codes for its properties. Information of a sensor property may include the type, the response curves, the sensitivity, the precision, the temperature range, the manufacturing and manufacturing date, the dynamic range, etc. The history of use of the sensor 10 may also be required and maintained by the box 100, including any damages sustained by a sensor 10 in the past.

Figure 2:
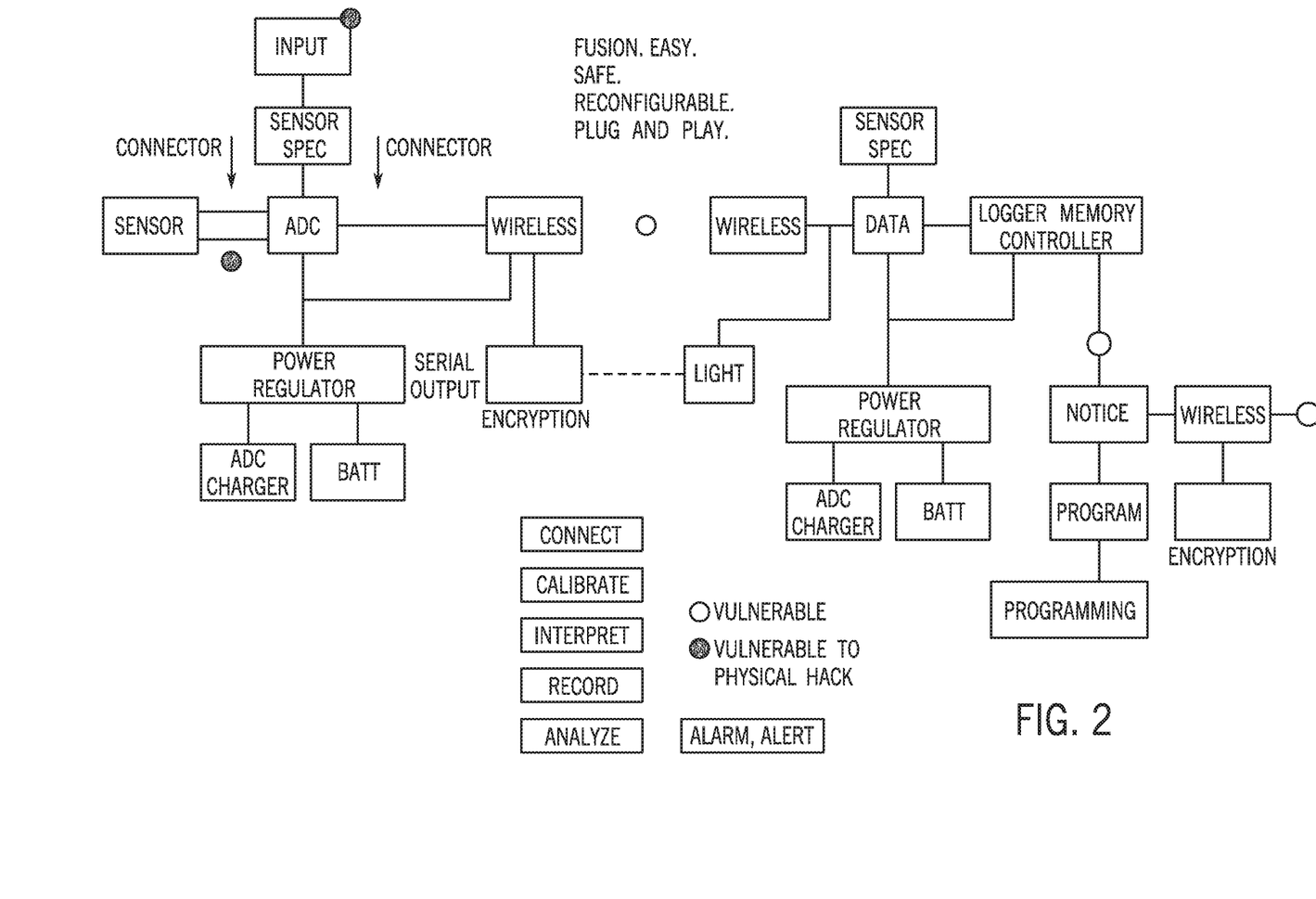
FIG. 2 illustrates a typical embodiment of a sensor read-out chart.

The present fusion system 1 relies on a data logging device which fuses signals obtained from the plurality of sensors 10. The system may display and record such signals, and may provide rudimentary analysis (threshold, pattern matching, etc). Based on set criteria, a sensory alarm may be sent through wireless connection, wired lines, or direct visual or audio alarms.

Figure 5:
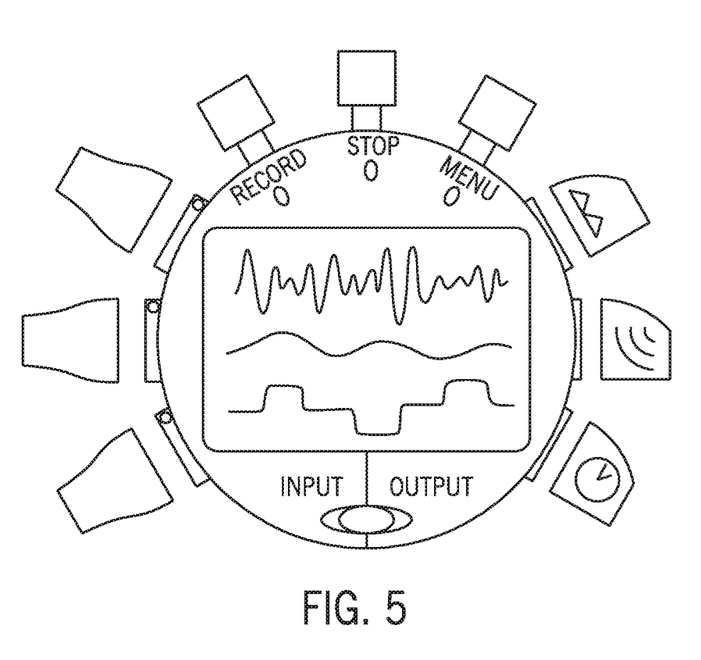
FIG. 5 illustrates an embodiment of the control box (or MIMO) of the present device and network which may connect with multiple sensors, multiple output units, a display/graphic user interface, and control buttons.

In one embodiment, the connector box 100 may have manual buttons for starting and stopping recording sensor data traces, for general setups, for setting alarms. Multiple sensor ports 80 may be placed on one side (in this particular embodiment) of the connector box 100. For instances, FIG. 1 illustrates three ports for the sensors 10 to be directly plugged into the connector box 100. It should be understood that any number of ports 80 may be utilized on the connector box 100. Once plugged in, the presence of the sensor 10 may be validated and verified to the user (green light). Sensors 10 may be plugged in and out physically.

The proximity of physical sensors 10 with respect to the connector box 100 may make it inherently secure, since only on-site users can detach and attach sensors 10. A sensor unit contains the following: a physical transduction element, the signal conditional unit, the data communication unit, and an interface. All such elements may be connected by wires. Or, there are two possible wireless modes to eliminate some wires in some selective applications. The transducer may communicate with the electronics unit wirelessly. Or the sensor unit itself may communicate with the computerized equipment wirelessly.

Also provided are data output ports 90 (as illustrated in FIG. 1 to the right hand side of the connector box 100). Proper desired sensors 10, once plugged in, allows connections using wireless protocols (such as Bluetooth, WiFi, WiFi direct, etc).

Figure 6:
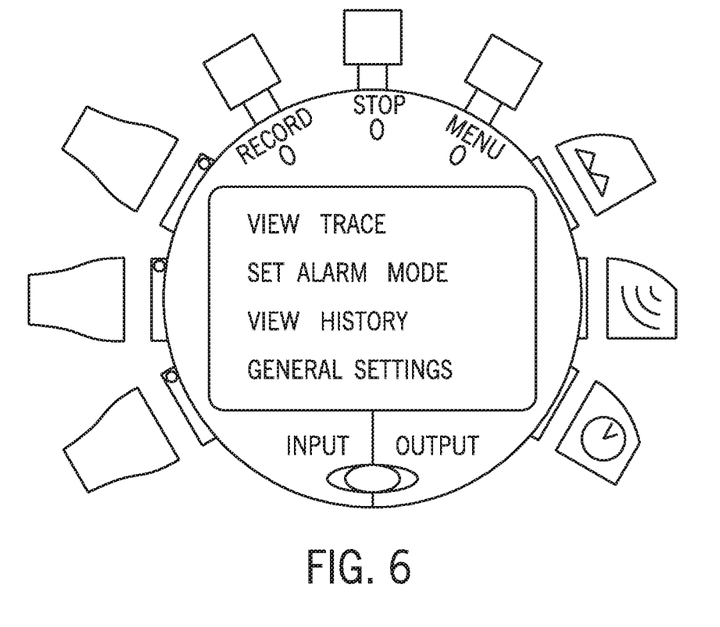
FIG. 6 illustrates one image of the user interface of the computerized equipment. It is a home-page, or main menu.
Figure 7:
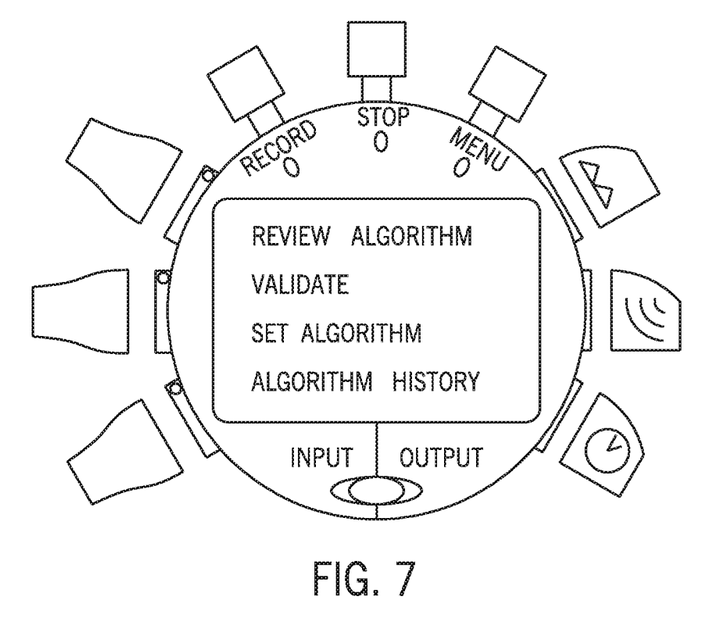
FIG. 7 illustrates a computer interface device, with a sub-menu page shown.

Algorithms for invoking alarm may be set manually, checked against actual historical data trace, validated, and then set to run. A typical screen shot for the algorithm setup screen is shown here.

The present system 1 may be capable of recording sensor data traces over time and may be programmed with a simple user interface. The programming allows the sensor 10 input to trigger alarms or communication, to be sent to desired users or for controlling a system automatically. The unique aspect of this connector box 100 lies in the fact that it is a programmable, ultraportable platform for sensor data recording and on-site analysis. The present system 1 may also reduce the requirements for electrical contacts, metal components, and unreliability, therein allowing operations with high bandwidth and less physical interferences.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A fusion sensor decision system comprising:
a plurality of sensors wherein the plurality of sensors have electrical circuits and wherein each of the plurality of sensors has a unique identification code wherein the sensors are passcode protected and wherein a first sensor of the plurality of sensors is in electrical communication with a first appliance or electronic device;
a control box having an interior having a central processing unit and wherein the interior of the control box has stored information related to a plurality of various identification codes of multiple sensors and wherein at least one of the identification codes stored within the control box includes the identification code of at least the first sensor of the plurality of sensors;
wherein each of the plurality of sensors sends out an electrical signal to the control box and wherein the plurality of sensors only communicates with the control box; and
wherein the signals of each of the plurality of sensors are self-calibrating between the sensor and control box.

2. The fusion sensor decision system of claim 1 further comprising:
a portable console wherein the portable console receives an electrical signal from the control box and wherein the portable console has a control screen which is capable of allowing a user to program the first appliance or electronic device connected to the first sensor.

3. The fusion sensor decision system of claim 1 wherein the electrical signal sent from the plurality of sensors to the control box is a wireless signal.

4. The fusion sensor decision system of claim 2 wherein the electrical signal sent from the control box to the portable console is a wireless signal.

5. The fusion sensor decision system of claim 1 further comprising:
a second sensor electrically connected to the first appliance or electronic device wherein the second sensor and first sensor each detect or sense a different environmental characteristic related to the first appliance or electronic device and wherein the first sensor and the second sensor both send a signal to the control box and wherein the control box utilizes its central processing unit to analyze the information obtained from the first sensor and the second sensor to send a signal back to the first appliance of electronic device to control the first appliance or electronic device.

6. The fusion sensor decision system of claim 1 wherein the plurality of sensors are electrically grounded.

7. The fusion sensor decision system of claim 1 wherein the control box is electrically grounded.

8. The fusion sensor decision system of claim 1 wherein the plurality of sensors is water-resistant.

9. The fusion sensor decision system of claim 1 wherein the control box is water-resistant.

10. A fusion sensor decision system comprising:
a plurality of sensors wherein the plurality of sensors have electrical circuits and wherein each of the plurality of sensors is passcode protected and has a unique identification code and wherein a first sensor of the plurality of sensors is in electrical communication with a first appliance or electronic device;
a control box having an interior having a central processing unit and wherein the central processing unit of the interior of the control box is connected to an Internet;
wherein the central processing unit obtains information related to a plurality of various identification codes of multiple sensors from the Internet and wherein at least one of the identification codes obtained from the Internet includes the identification code of at least the first sensor of the plurality of sensors;

wherein each of the plurality of sensors sends out an electrical signal to the control box and wherein the plurality of sensors only communicates with the control box; and wherein the signals of each of the plurality of sensors are self-calibrating.

11. The fusion sensor decision system of claim 10 wherein the plurality of sensors are electrically grounded.

12. The fusion sensor decision system of claim 10 wherein the control box is electrically grounded.

13. The fusion sensor decision system of claim 10 wherein the plurality of sensors is water-resistant.

14. The fusion sensor decision system of claim 10 wherein the control box is water-resistant.

15. The fusion sensor decision system of claim 10 further comprising:

a second sensor electrically connected to the first appliance or electronic device wherein the second sensor and first sensor each detect or sense a different environmental characteristic related to the first appliance or electronic device and wherein the first sensor and the second sensor both send a signal to the control box and wherein the control box utilizes its central processing unit to analyze the information obtained from the first sensor and the second sensor to send a signal back to the first appliance of electronic device to control the first appliance or electronic device.

16. The fusion sensor decision system of claim 5 wherein both the first sensor and the second sensor have the same function and detect the same environmental condition and wherein the control box averages a reading from the first sensor and a reading from the second sensor.

17. The fusion sensor decision system of claim 15 wherein both the first sensor and the second sensor have the same function and detect the same environmental condition and wherein the control box averages a reading from the first sensor and a reading from the second sensor.

18. A fusion sensor decision system comprising:

a plurality of sensors wherein the plurality of sensors have electrical circuits and wherein each of the plurality of sensors has a unique identification code and wherein a first sensor of the plurality of sensors is in electrical communication with a first appliance or electronic device;

a control box having an interior having a central processing unit and wherein the interior of the control box has stored information related to a plurality of various identification codes of multiple sensors and wherein at least one of the identification codes stored within the control box includes the identification code of at least the first sensor of the plurality of sensors;

wherein each of the plurality of sensors sends out an electrical signal to the control box;

wherein the signals of each of the plurality of sensors are self-calibrating between the sensor and control box; and a second sensor electrically connected to the first appliance or electronic device wherein the second sensor and first sensor each detect or sense a different environmental characteristic related to the first appliance or electronic device and wherein the first sensor and the second sensor both send a signal to the control box and wherein the control box utilizes its central processing unit to analyze the information obtained from the first sensor and the second sensor to send a signal back to the first appliance of electronic device to control the first appliance or electronic device.

19. A fusion sensor decision system comprising:

a plurality of sensors wherein the plurality of sensors have electrical circuits and wherein each of the plurality of sensors has a unique identification code and wherein a first sensor of the plurality of sensors is in electrical communication with a first appliance or electronic device;

a control box having an interior having a central processing unit and wherein the central processing unit of the interior of the control box is connected to an Internet;

wherein the central processing unit obtains information related to a plurality of various identification codes of multiple sensors from the Internet and wherein at least one of the identification codes obtained from the Internet includes the identification code of at least the first sensor of the plurality of sensors;

wherein each of the plurality of sensors sends out an electrical signal to the control box;

wherein the signals of each of the plurality of sensors are self-calibrating; and a second sensor electrically connected to the first appliance or electronic device wherein the second sensor and first sensor each detect or sense a different environmental characteristic related to the first appliance or electronic device and wherein the first sensor and the second sensor both send a signal to the control box and wherein the control box utilizes its central processing unit to analyze the information obtained from the first sensor and the second sensor to send a signal back to the first appliance of electronic device to control the first appliance or electronic device.

* * * * *